US010132371B2

(12) United States Patent
Taniguchi et al.

(10) Patent No.: US 10,132,371 B2
(45) Date of Patent: Nov. 20, 2018

(54) BICYCLE DISC BRAKE ROTOR

(71) Applicant: Shimano Inc., Sakai, Osaka (JP)

(72) Inventors: Masanori Taniguchi, Osaka (JP); Toru Iwai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/399,316

(22) Filed: Jan. 5, 2017

(65) Prior Publication Data

US 2017/0204923 A1    Jul. 20, 2017

(30) Foreign Application Priority Data

Jan. 15, 2016  (JP) ................................ 2016-006311

(51) Int. Cl.
| | |
|---|---|
| *F16D 65/02* | (2006.01) |
| *F16D 65/12* | (2006.01) |
| *F16D 65/78* | (2006.01) |
| *F16D 65/847* | (2006.01) |

(52) U.S. Cl.
CPC ......... *F16D 65/128* (2013.01); *F16D 65/123* (2013.01); *F16D 65/125* (2013.01); *F16D 65/847* (2013.01); *F16D 2065/132* (2013.01); *F16D 2065/1316* (2013.01); *F16D 2065/1392* (2013.01); *F16D 2065/789* (2013.01); *F16D 2250/0084* (2013.01)

(58) Field of Classification Search
CPC .... F16D 65/128; F16D 65/123; F16D 65/125; F16D 65/487; F16D 2065/789; F16D 2065/1311; F16D 2065/1328; F16D 2065/1316; F16D 65/847; F16D 2065/132; F16D 2065/1392; F16D 2250/0084; B62L 1/005
USPC ......... 188/218 XL, 71.6, 26, 264 AA, 264 F, 188/264 CC, 250 D, 58, 114; 301/6.8; D12/180
See application file for complete search history.

(56) References Cited

U.S. PATENT DOCUMENTS

| 9,593,727 | B1* | 3/2017 | Nakakura | ............. F16D 65/128 |
| 9,777,784 | B2* | 10/2017 | Iwai | ...................... F16D 65/123 |
| 2005/0006186 | A1* | 1/2005 | Iwai | ........................ B62L 1/005 188/26 |

(Continued)

FOREIGN PATENT DOCUMENTS

DE    10 2005 033 765 A1    1/2007

*Primary Examiner* — Pamela Rodriguez
(74) *Attorney, Agent, or Firm* — Global IP Counselors, LLP

(57) ABSTRACT

A bicycle disc brake rotor that further increases heat dissipation has a rotation axis. The bicycle disc brake rotor includes at east one outer circumferential portion, which includes at least one brake surface, and first and second inner circumferential parts, which are coupled to the outer circumferential portion. Each of the first and second inner circumferential parts is at least partially located radially inward from the outer circumferential portion with respect to the rotation axis. The first and second inner circumferential parts are arranged to form a gap in between in an axial direction that extends parallel to the rotation axis. At least one of the first and second inner circumferential parts includes at least one cooling enhancement section. The cooling enhancement section includes at least one opening that is in communication with the gap.

18 Claims, 5 Drawing Sheets

(56) References Cited

U.S. PATENT DOCUMENTS

| | | | |
|---|---|---|---|
| 2011/0240420 A1* | 10/2011 | Souwa | F16D 65/12 188/218 XL |
| 2012/0048661 A1* | 3/2012 | Moore | F16D 65/122 188/218 XL |
| 2012/0222926 A1 | 9/2012 | Iwai et al. | |
| 2013/0075207 A1* | 3/2013 | Bruntz | B23P 15/00 188/218 XL |
| 2013/0133996 A1* | 5/2013 | Iwai | C23C 4/02 188/218 XL |
| 2013/0168193 A1 | 7/2013 | Iwai et al. | |
| 2015/0034431 A1 | 2/2015 | Wen | |

* cited by examiner

BICYCLE DISC BRAKE ROTOR

CROSS-REFERENCE TO RELATED APPLICATIONS

This application claims priority to Japanese Patent Application No. 2016-006311, filed on Jan. 15, 2016. The entire disclosure of Japanese Patent Application No. 2016-006311 is hereby incorporated herein by reference.

BACKGROUND

Field of the Invention

The present invention relates to a disc brake rotor for a bicycle.

Background Information

Some bicycles are provided with a disc brake device for deaccelerating and stopping the bicycle. Typically, the disc brake device includes a disc brake rotor and a caliper. The disc brake rotor is mounted to rotate integrally with a wheel. The caliper is typically mounted to a frame of the bicycle and arranged to press brake pads against the disc brake rotor to apply braking, force to the wheel. When the brake pads are pressed against the disc brake rotor, frictional heat is generated. The frictional heat increases the temperature of the disc brake rotor. Thus, the disc brake rotor needs to be highly heat dissipative. For example, U.S. Patent Application Publication No. 2013/0168193 discloses an example of a technique for increasing heat dissipation of a disc brake rotor b arranging a plurality of fins on the disc brake rotor.

SUMMARY

One object of the present invention to provide a bicycle disc brake rotor that further increases heat dissipation.

(1) A first aspect of a bicycle disc brake rotor according to the present invention has a rotation axis and includes at least one outer circumferential portion including at least one brake surface, a first inner circumferential part coupled to the at least one outer circumferential portion, and a second inner circumferential part coupled to the at least one outer circumferential portion. Each of the first and second inner circumferential parts is at least partially located radially inward from the outer circumferential portion with respect to the rotation axis. The first and second inner circumferential parts are arranged to form a gap between the first and second inner circumferential parts in an axial direction that extends parallel to the rotation axis. At least one of the first and second inner circumferential parts includes at least one cooling enhancement section. The at least one cooling enhancement section includes at least one opening that is in communication with the gap.

(2) In a second aspect of the bicycle disc brake rotor according to the previous aspect, the first and second inner circumferential parts are opposed in the axial direction, which extends parallel to the rotation axis.

(3) In a third aspect of the bicycle disc brake rotor according to any of the previous aspects, each of the first and second inner circumferential parts partially overlaps with the outer circumferential portion as viewed in the axial direction, which extends parallel to the rotation axis.

(4) in a fourth aspect of the bicycle disc brake rotor according to any of the previous aspects, the at least one cooling enhancement section further includes at least one heat dissipation fin.

(5) In a fifth aspect of the bicycle disc brake rotor according to any of the previous aspects, the at least one heat dissipation fin includes at least one heat dissipation piece that faces in the axial direction.

(6) In a sixth aspect of the bicycle disc brake rotor according to any of the previous aspects, the at least one opening and the at least one heat dissipation piece are obtained by partially bending at least one of the first and second inner circumferential parts.

(7) A seventh aspect of the bicycle disc brake rotor according to any of the previous aspects further includes a coupling member including a hub coupling portion coupled to a hub of a bicycle.

(8) in an eighth aspect of the bicycle disc brake rotor according to any of the previous aspects, the coupling member is coupled to the at least one outer circumferential portion.

(9) In a ninth aspect of the bicycle disc brake rotor according to any of the previous aspects, the at least one heat dissipation fin is located between the hub coupling portion and the at least one outer circumferential portion in a radial direction with respect to the rotation axis.

(10) in a tenth aspect of the bicycle disc brake rotor according to any of the previous aspects, the coupling member further includes at least two connection portions coupled to the at least one outer circumferential portion and extending radially outward from the hub coupling portion, and the at least one heat dissipation fin is located between the at least two connection portions in a circumferential direction with respect to the rotation axis.

(11) In an eleventh aspect of the bicycle disc brake rotor according to any of the previous aspects, the coupling member further includes at least two connection portions coupled to the at least one outer circumferential portion and extending radially outward from the hub coupling portion, and each of the first and second inner circumferential parts overlaps with the at least two connection portions as viewed in the axial direction, which extends parallel to the rotation axis.

(12) In a twelfth aspect of the bicycle disc brake rotor according to any of the previous aspects, the at least one cooling enhancement section includes a first cooling enhancement section and a second cooling enhancement section, the first inner circumferential portion includes the first cooling enhancement section, and the second inner circumferential portion includes the second cooling enhancement section.

(13) In a thirteenth aspect of the bicycle disc brake rotor according to any of the previous aspects, the first cooling enhancement section includes a first opening, and the second cooling enhancement section includes a second opening that differs from the first opening.

(14) In a fourteenth aspect of the bicycle disc brake rotor according to any of the previous aspects, the second opening has a wider area than the first opening.

(15) in a fifteenth aspect of the present invention, in the bicycle disc brake rotor according to any of the previous aspects, the first opening is a slit.

(16) in a sixteenth aspect of the bicycle disc brake rotor according to any of the previous aspects, the first and second inner circumferential parts are separated by a distance that increases toward the rotation axis in a radial direction with respect to the rotation axis.

(17) In a seventeenth aspect of the bicycle disc brake rotor according to any of the previous aspects, the first and second inner circumferential parts have a higher thermal conductivity than the at least one outer circumferential portion.

(18) in an eighteenth aspect of the bicycle disc brake rotor according to any of the previous aspects, the at least one outer circumferential portion includes a first material, and the first and second inner circumferential parts include a second material that differs from the first material.

(19) in a nineteenth aspect of the bicycle disc brake rotor according to any of the previous aspects, the first material is stainless steel, and the second material is aluminum or an aluminum alloy.

(20) A twentieth aspect of the bicycle disc brake rotor according to any of the previous aspects further includes a third inner circumferential part. The third inner circumferential part is coupled to the at least one outer circumferential portion and includes a section located radially inward from the outer circumferential portion with respect to the rotation axis. The third inner circumferential part is located between the first and second inner circumferential parts in a direction in which the rotation axis extends.

The present invention provides a bicycle disc brake rotor that further increases heat dissipation.

BRIEF DESCRIPTION OF THE DRAWINGS

Referring now to the attached drawings which form a part of this original disclosure.

DESCRIPTION OF THE EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Illustrative Embodiment

Figure 1:
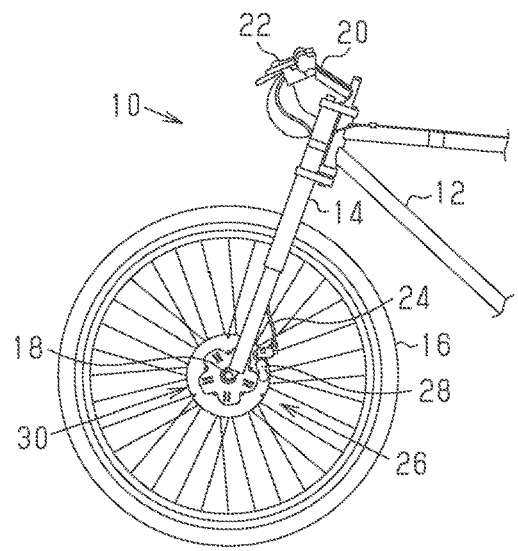
FIG. 1 is a side elevational view showing a front portion of a bicycle equipped with a disc brake device having a bicycle disc brake rotor according to one illustrative embodiment.

As shown in FIG. 1, a bicycle 10 includes a frame 12, a front fork 14, a front wheel 16, a hub 18, a handlebar 20, a brake lever 22 and a disc brake device 26. The disc brake device 26 includes a hose 24, a caliper 28, and a bicycle disc brake rotor 30.

The frame 12 supports the front fork 14 and the handlebar 20. The handlebar 20 is fastened to the front fork 14. The front fork 14 is configured to rotate relative to the frame 12 so that the direction in which the bicycle 10 moves forward can be changed. The front fork 14 supports the front wheel 16. The front wheel 16 is configured to rotate relative to the front fork 14. The hose 24 is connected to the brake lever 22 and the caliper 28 so that the hose 24 transmits force applied to the brake lever 22 to the caliper 28 using hydraulic pressure.

The bicycle disc brake rotor 30 is fastened to the hub 18 of the front wheel 16 to rotate integrally with the front wheel 16. The caliper 28 is coupled to the front fork 14 to selectively switch between a state in which the caliper 28 applies braking force to the hub 18 of the front wheel 16 and a state in which the caliper 28 applies no braking force to the hub 18 of the front wheel 16. The caliper 28 includes pistons, brake pads, and springs (not shown).

The brake pads are coupled to the pistons so that the brake pads are spaced apart from the bicycle disc brake rotor 30 by a gap. The springs apply force to the pistons. The force acts to part the pistons away from the bicycle disc brake rotor 30. In one example, force applied to the brake lever 22 changes force applied to the pistons through the hose 24.

When no force is applied to the brake lever 22, the bicycle disc brake rotor 30 is separated from the brake pads by a maximum distance. As the force applied to the brake lever 22 increases from this state, the pistons are moved by the hydraulic pressure. The movement of the pistons moves the brake pads toward the bicycle disc brake rotor 30. When the brake pads are in contact with the bicycle disc brake rotor 30, a braking force is applied to the bicycle disc brake rotor 30. The bicycle 10 also includes a rear wheel (not shown), which includes a device similar to the disc brake device 26 or a brake device of a type different from a disc brake.

Figure 2:
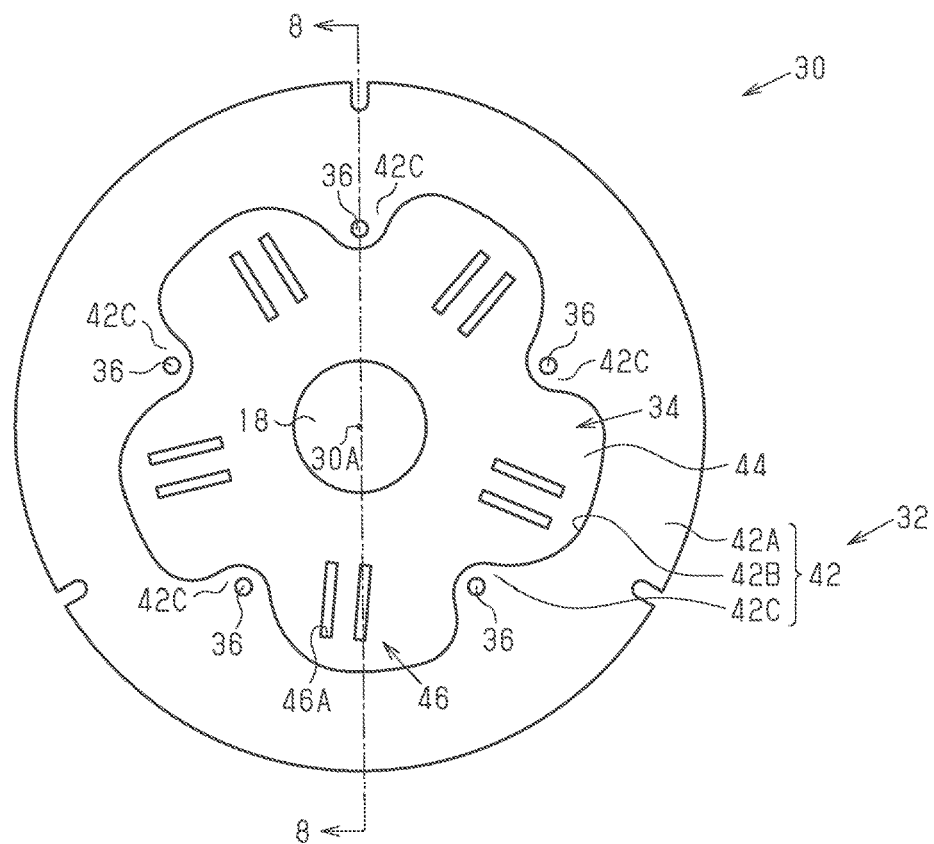
FIG. 2 is a first (front) side elevational view of the bicycle disc brake rotor shown in FIG. 1.
Figure 3:
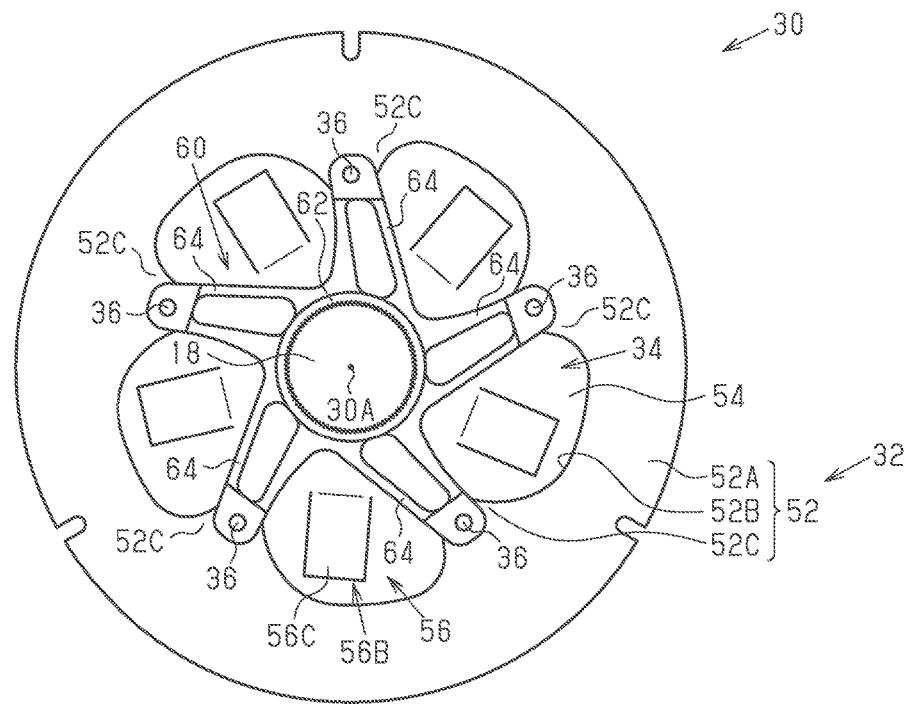
FIG. 3 is a second (rear) side elevational view of the bicycle disc brake rotor shown in FIG. 2.

FIG. 2 is a first (front) side elevational view of the bicycle disc brake rotor 30. FIG. 3 is a second (rear) side elevational view of the bicycle disc brake rotor 30. When the bicycle disc brake rotor 30 is coupled to the hub 18, a surface of the bicycle disc brake rotor 30 viewed from the left side in the forward direction of the bicycle 10 is referred to as the front surface of the bicycle disc brake rotor 30. Additionally, a surface of the bicycle disc brake rotor 30 located at a side opposite to the side of the front surface is referred to as the rear surface of the bicycle disc brake rotor 30. The bicycle disc brake rotor 30 includes a rotation axis 30A, at least one outer circumferential portion 32, and an inner circumferential portion 34. The inner circumferential portion 34 is coupled to the at least one outer circumferential portion 32. The inner circumferential portion 34 is at least partially located radially inward from the outer circumferential portion 32 with respect to the rotation axis 30A. The bicycle disc brake rotor 30 further includes a plurality of fastening members 36 and a coupling member 60. In one example, the fastening members 36 are rivets.

The hub 18 of the front wheel 16 has an axis that is aligned with the rotation axis 30A. The coupling member 60, which is shown in FIG. 3, couples the bicycle disc brake rotor 30 to the huh 18 of the front wheel 15. The coupling member 60 includes a hub coupling portion 62 and at least two connection portions 64. The hub coupling portion 62 is tubular and configured to receive the hub 18. The connection portions 64, which connect the outer circumferential portion 32 and the coupling member 60, radially extend from the hub coupling portion 62 in a radial direction (hereafter, referred to as "second direction D2") with respect to the rotation axis 30A.

The outer circumferential portion 32 is pressed by the brake pads and shown in FIGS. 2 and 3. The outer circumferential portion 32 includes a first outer circumferential part 42 and a second outer circumferential part 52. The inner circumferential portion 34 is configured to effectively dissipate heat from the bicycle disc brake rotor 30. The inner circumferential portion 34 includes a first inner circumferential part 44 and a second inner circumferential part 54. The first outer circumferential part 42, the first inner circumferential part 44, the second inner circumferential part 54, and the second outer circumferential part 52 are arranged in a direction parallel to the rotation axis 30A (hereafter, referred to as "first direction D1") and bonded to one another.

Figure 4:
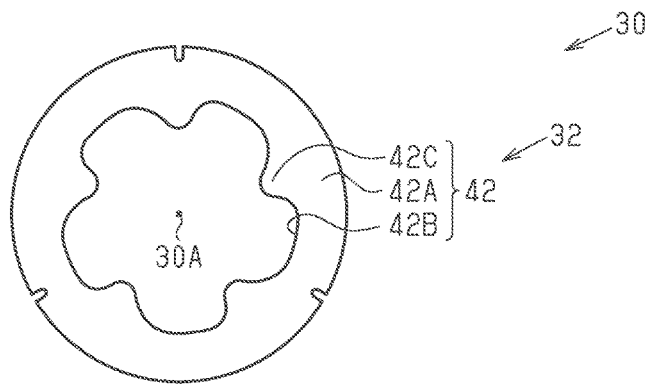
FIG. 4 is a first side elevational view showing a first outer circumferential portion of the bicycle disc brake rotor shown in FIG. 2.
Figure 5:
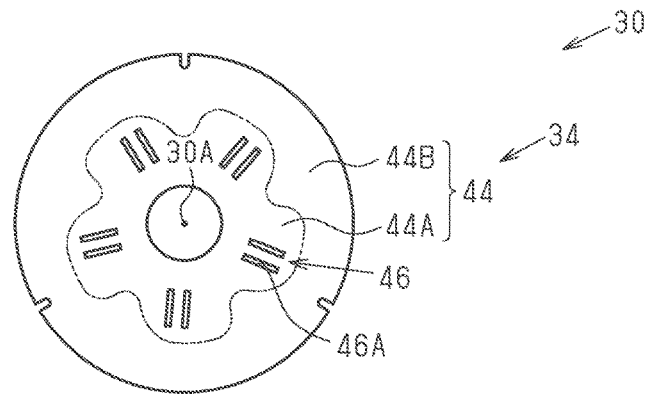
FIG. 5 is a first side elevational view showing a first inner circumferential portion of the bicycle disc brake rotor shown in FIG. 2.
Figure 6:
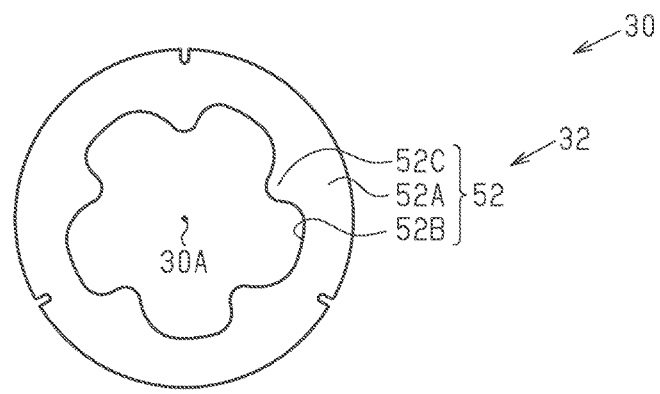
FIG. 6 is a diagram showing a second outer circumferential portion of the bicycle disc brake rotor shown in FIG. 3.
Figure 7:
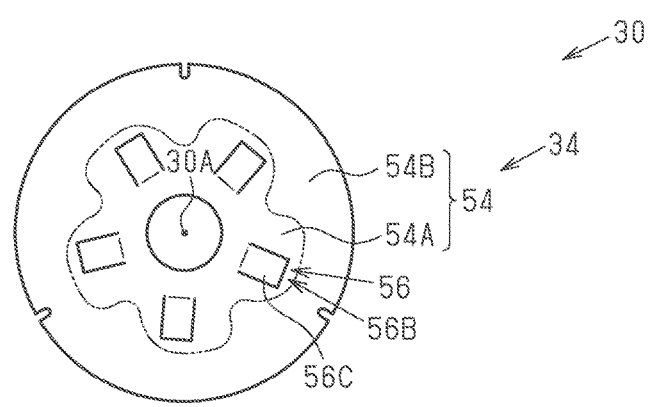
FIG. 7 is a second side elevational view showing a second inner circumferential portion of the bicycle disc brake rotor shown in FIG. 3.

As shown in FIGS. 4 and 6, the first outer circumferential part 42 and the second outer circumferential part 52 are annular plates and formed separately from each other. As shown in FIGS. 5 and 7, the first inner circumferential part 44 and the second inner circumferential part 54 are discs and formed separately from each other.

The first outer circumferential part 42 and the second outer circumferential part 52 each include at least one brake surface, to which the brake pads are pressed. More specifically, the first outer circumferential part 42 includes a first brake surface 42A. The second outer circumferential part 52 includes a second brake surface 52A. Thus, it is preferred that the outer circumferential portion 32 has a high thermal resistance and a high wear resistance. The first outer circumferential part 42 and the second outer circumferential part 52 include a first material. One example of the first material is stainless steel.

It is preferred that the bicycle disc brake rotor 30 be light in weight and highly heat dissipative. Thus, the first inner circumferential part 44 and the second inner circumferential part 54 include a second material, which differs from the first material. One example of the second material is aluminum or an aluminum alloy. Aluminum has a higher thermal conductivity than stainless steel. Therefore, the first inner circumferential part 44 and the second inner circumferential part 54 are superior in heat dissipation to the first outer circumferential part 42 and the second outer circumferential part 52, which are formed from stainless steel. Aluminum and an aluminum alloy also contribute to weight reduction of the first inner circumferential part 44 and the second inner circumferential part 54.

The outer circumferential portion 32 and the inner circumferential portion 34 can have any combination of materials. The condition of a preferred combination includes, for example, two conditions described below. The first condition is that the outer circumferential portion 32 has higher thermal resistance and higher wear resistance than the inner circumferential portion 34. The second condition is that the inner circumferential portion 34 has a higher thermal conductivity than the outer circumferential portion 32.

As shown in FIG. 4, the first outer circumferential part 42 includes the first brake surface 42A and a first hole 42B. The brake pads are pressed against the first brake surface 42A. The first hole 42B exposes the first inner circumferential part 44. The coupling member 60 is connected to first connection sections 42C, which project from the first outer circumferential part 42 toward the rotation axis 30A in the radial direction with respect to the rotation axis 30A. The fastening members 36 fasten an end of each of the connection portions 64 to the corresponding one of the first connection sections 42C.

As shown in FIG. 5, the first inner circumferential part 44 is a disc that is machined to increase the heat dissipation of the bicycle disc brake rotor 30. The first inner circumferential part 44 includes a first section 44A, a second section 44B, and a first cooling enhancement section 46. The first section 44A is exposed from the first hole 42B in the first outer circumferential part 42 and overlapped with the connection portions 64 of the coupling member 60 as viewed in the first direction D1. The first inner circumferential part 44 partially overlaps with the corresponding part of the outer circumferential portion 32 as viewed in the first direction D1. More specifically, the second section 44B of the first inner circumferential part 44 is bonded to the first outer circumferential part 42 and overlapped with the first outer circumferential part 42 as viewed in the first direction D1.

Figure 8:
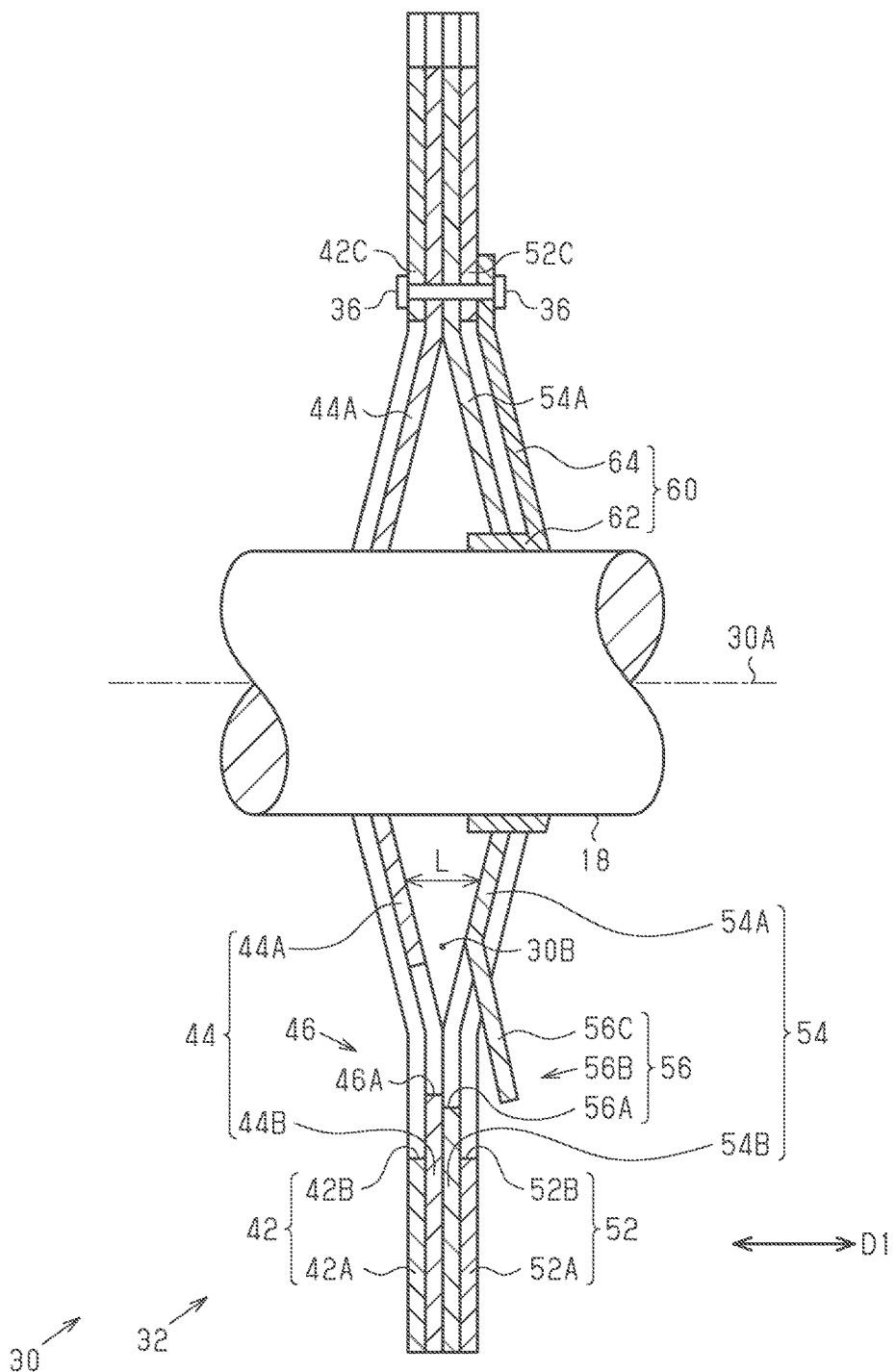
FIG. 8 is a cross-sectional view of the bicycle disc brake rotor taken along section line 8-8 in FIG. 2.

The first cooling enhancement section 46, which is arranged to increase the heat dissipation of the bicycle disc brake rotor 30, includes a plurality of first openings 46A (refer to FIGS. 5 and 8). In one example, the first openings 46A are slits.

As shown in FIG. 6, the second outer circumferential part 52 includes the second brake surface 52A and a second hole 52B. The brake pads are pressed against the second brake surface 52A. The second hole 52B exposes the second inner circumferential part 54. The coupling member 60 is connected to second connection sections 52C, which project from the second outer circumferential part 52 toward the rotation axis 30A in the radial direction with respect to the rotation axis 30A. The fastening members 36 fasten an end of each of the connection portions 64 to the corresponding one of the second connection sections 52C.

As shown in FIG. 7, the second inner circumferential part 54 is a disc that is machined to increase the heat dissipation of the bicycle disc brake rotor 30. The second inner circumferential part 54 includes a third section 54A, a fourth section 54B, and a second cooling enhancement section 56. The second cooling enhancement section 56 includes a plurality of heat dissipation fins 56B. The third section 54A is exposed from the second hole 52B in the second outer circumferential part 52 and overlapped with the connection portions 64 of the coupling member 60 as viewed in the first direction D1. The heat dissipation fins 56B are arranged between the at least two connection portions 64 in a circumferential direction (hereafter, referred to as "third direction D3") of the rotation axis 30A and between the hub coupling portion 62 and the second outer circumferential part 52 in the second direction D2. The second inner circumferential part 54 partially overlaps with the corresponding part of the outer circumferential portion 32 as viewed in the first direction D1. More specifically, the fourth section 54B is bonded to the second outer circumferential part 52 and overlapped with the second outer circumferential part 52 as viewed in the first direction D1. The second cooling enhancement section 56 includes second openings 56A, which differ from the first openings 46A. The area of the second openings 56A is wider than the area of the first openings 46A. The heat dissipation fins 56B include heat dissipation pieces 56C. In one example, the second inner circumferential part 54 includes five heat dissipation fins 56B. The second openings 56A and the heat dissipation pieces 56C are formed by partially bending the second inner circumferential part 54. In one example, the heat dissipation pieces 56C are open toward the second outer circumferential part 52 in the second direction D2.

As shown in FIG. 8, the first inner circumferential part 44 and the second inner circumferential part 54 are opposed in the first direction D1. The second section 44B of the first inner circumferential part 44 is bonded to the fourth section 54B of the second inner circumferential part 54.

The first section 44A of the first inner circumferential part 44 and the third section 54A of the second inner circumferential part 54 are configured to extend toward the outer side of the bicycle disc brake rotor 30 in the first direction D1. This forms a gap 30B between the first inner circumferential part 44 and the second inner circumferential part 54, which are opposed in the first direction D1. The gap 30B is in communication with the exterior of the bicycle disc brake rotor 30 by the first openings 46A in the first inner circumferential part 44. The distance L between the first inner circumferential part 44 and the second inner circumferential part 54 in the first direction D1 increases toward the rotation axis 30A from an outer side of the bicycle disc brake rotor 30 in the second direction D2.

One example of a method for manufacturing the bicycle disc brake rotor 30 will now be described with reference to FIGS. 2 to 7.

In a first step, a material of aluminum or an aluminum alloy is machined to form the first inner circumferential part 44 that does not include the first cooling enhancement section 46 and the second inner circumferential part 54 that does not include the second cooling enhancement section 56. In a second step, an alumite film is formed on the entire peripheral surfaces of each of the first inner circumferential part 44 and the second inner circumferential part 54. In a third step, the first section 44A of the first inner circumferential part 44 and the third section 54A of the second inner circumferential part 54 are each masked. In a fourth step, the alumite films are removed from the second section 44B of the first inner circumferential part 44 and the fourth section 54B of the second inner circumferential part 54. The first to fourth steps form the first inner circumferential part 44, in which the alumite film is formed on the first section 44A but not on the second section 44B, and the second inner circumferential part 54, in which the aluminum film is formed on the third section 54A but not on the fourth section 54B.

In a fifth step, a stainless steel material is machined to form the first outer circumferential part 42 and the second outer circumferential part 52. In a sixth step, the first outer circumferential part 42 is etched to form the first hole 42B in the first outer circumferential part 42, and the second outer circumferential part 52 is etched to form the second hole 52B in the second outer circumferential part 52. The fifth and sixth steps can be performed in parallel with the first to fourth steps or prior to the first to fourth steps.

In a seventh step, the first outer circumferential part 42, the first inner circumferential part 44, the second inner circumferential part 54, and the second outer circumferential part 52 are sequentially arranged in the first direction D1. The second section 44B of the first inner circumferential part 44 overlaps with the fourth section 54B of the second inner circumferential part 54. In an eighth step, the first outer circumferential part 42, the second section 44B of the first inner circumferential part 44, the fourth section 54B of the second inner circumferential part 54, and the second outer circumferential part 52 are bonded to one another. One example of bonding means is diffusion bonding. The alumite films are formed on the peripheral surface of the first section 44A and the peripheral surface of the third section 54A. Thus, the first section 44A and the third section 54A are not bonded to the first outer circumferential part 42 and the second outer circumferential part 52.

In a ninth step, a central part of the first outer circumferential part 42 is removed to form the first hole 42B in the first outer circumferential part 42. This exposes the first section 44A of the first inner circumferential part 44. Also, a central part of the second outer circumferential part 52 is removed to form the second hole 52B in the second outer circumferential part 52. This exposes the third section 54A of the second inner circumferential part 54.

In a tenth step, the first openings 46A are formed in the first inner circumferential part 44. In an eleventh step, the second inner circumferential part 54 is cut to form the heat dissipation pieces 56C. In a twelfth step, the first section 44A of the first inner circumferential part 44 and the third section 54A of the second inner circumferential part 54 are bent to extend toward the outer side of the bicycle disc brake rotor 30 in the first direction D1. The tenth to twelfth steps can be performed in any order.

In a thirteenth step, the second inner circumferential part 54 is bent to form the heat dissipation pieces 56C on the second inner circumferential part 54. In a fourteenth step, holes are formed in each of the first outer circumferential part 42 and the second outer circumferential part 52 to receive the fastening members 36. In a fifteenth step, the fastening members 36 couple the coupling member 60 to the first outer circumferential part 42 and the second outer circumferential part 52. The fourteenth and fifteenth steps can be performed prior to the thirteenth step.

The operation and advantages of the bicycle disc brake rotor 30 will now be described below.

The first inner circumferential part 44 and the second inner circumferential part 54 are opposed in an axial direction that extends parallel to the rotation axis 30A. In this structure, heat is dissipated from the bicycle disc brake rotor 30 to the air in the gap 30B by the surface of the first inner circumferential part 44 that is opposed to the second inner circumferential part 54 and the surface of the second inner circumferential part 54 that is opposed to the first inner circumferential part 44. This increases the area of surfaces of the bicycle disc brake rotor 30 that effectively dissipate heat. Thus, the bicycle disc brake rotor 30 is highly heat dissipative.

The first inner circumferential part 44 is in contact with the first outer circumferential part 42 at a portion overlapping with the first outer circumferential part 42 as viewed in the axial direction. This structure increases the area where the first inner circumferential part 44 is in contact with the first outer circumferential part 42 without increasing the outer diameter of the first outer circumferential part 42. The second inner circumferential part 54 and the second outer circumferential part 52 have the same advantage.

The second openings 56A and the heat dissipation pieces 56C are formed by partially bending the second inner circumferential part 54. In this structure, the two functional parts forming, the second cooling enhancement section 56 are formed in the second inner circumferential part 54 in one step. This increases the efficiency of the task for forming the second cooling enhancement section 56.

The first cooling enhancement section 46 includes the first openings 46A. In this structure, air flows from the exterior of the bicycle disc brake rotor 30 to the gap 30B through the first openings 46A. This enhances heat exchange in the first inner circumferential part 44.

The second cooling enhancement section 55 includes the second openings 56A, which differ from the first openings 46A. In this structure, air flows from the exterior of the bicycle disc brake rotor 30 to the gap 30B through the second openings 56A. This enhances heat exchange in the second inner circumferential part 54.

The first inner circumferential part 44 and the second inner circumferential part 54, which are opposed in the axial direction, include the first openings 46A and the second openings 56A, respectively. In this structure, air easily flows from the exterior of the bicycle disc brake rotor 30, through the first openings 46A (or the second openings 56A), the gap 30B, and the second openings 56A (or the first openings 46A), and then to the exterior of the bicycle disc brake rotor 30. This effectively supplies the air to the gap 30B from the exterior of the bicycle disc brake rotor 30 and further increases the heat dissipation of the bicycle disc brake rotor 30.

Modified Examples

The above description is intended to illustrate embodiments of a bicycle disc brake rotor according to the present invention and not to restrict such embodiments. For example, the above embodiment can be modified as follows. Further, modified examples can be combined.

Figure 9:
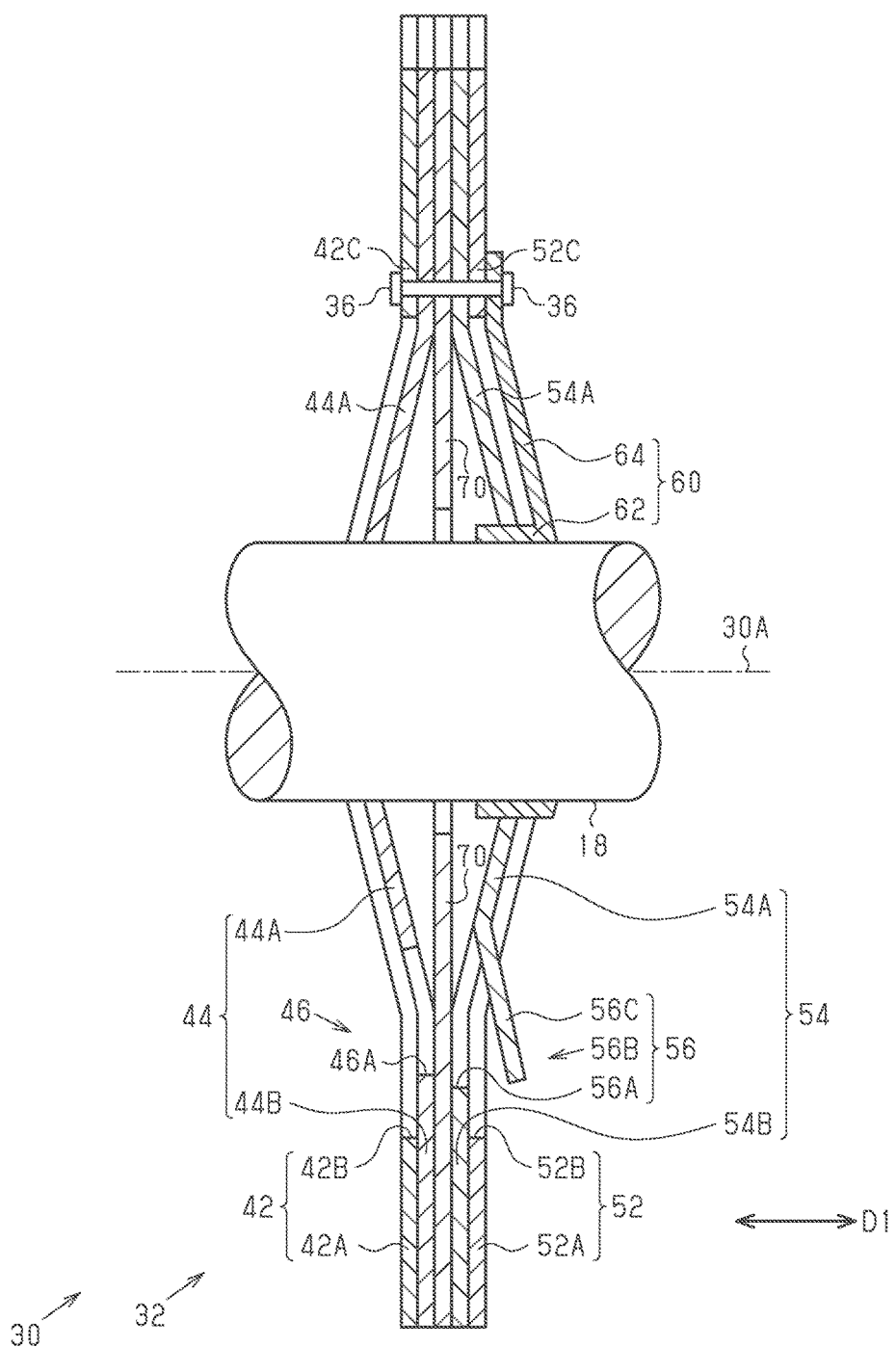
FIG. 9 is a cross-sectional view showing a modified example of a bicycle disc brake rotor taken along section line 8-8 in FIG. 2.

The bicycle disc brake rotor 30 can include any component. In one example, the bicycle disc brake rotor 30 can further include a third inner circumferential part 70, which is shown in FIG. 9. The third inner circumferential part 70 is coupled to the outer circumferential portion 32 and includes a section located between the first inner circumferential part 44 and the second inner circumferential part 54 in the first direction D1 at an inner side of the outer circumferential portion 32 in the second direction D2. This structure increases the area of surfaces of the bicycle disc brake rotor 30 that effectively dissipate heat. This further increases the heat dissipation of the bicycle disc brake rotor 30.

The third inner circumferential part 70 can have any structure. In one example, the third inner circumferential part 70 includes at least one of a cooling enhancement section similar to the first cooling enhancement section 46 of the first inner circumferential part 44 and a cooling enhancement section similar to the second cooling enhancement section 56 of the second inner circumferential part 54.

The heat dissipation fins 56B can have any structure. In one example, each heat dissipation fin 56B is open in the third direction D3. In addition to the direction in which the heat dissipation fins 56B are open, the number and the position of the heat dissipation fins 56B can be changed.

The fastening members 36 can be changed to any members. In one example, the fastening members 36 are formed by an adhesion agent that fastens ends of the connection portions 64 to the first connection parts 42C. In another example, the fastening members 36 are welded portions that bond ends of the connection portions 64 and the first connection parts 42C.

The outer circumferential portion 32 can be formed from any material. In one example, one of the first outer circumferential part 42 and the second outer circumferential part 52 includes a first material. The other one of the first outer circumferential part 42 and the second outer circumferential part 52 includes a material that differs from the first material.

The inner circumferential portion 34 can be formed from any material. In one example, one of the first inner circumferential part 44 and the second inner circumferential part 54 includes a second material. The other one of the first inner circumferential part 44 and the second inner circumferential part 54 includes a material that differs from the second material.

The outer circumferential portion 32 of the bicycle disc brake rotor 30 can be changed to any structure that includes at least one outer circumferential portion 32. In one example, the bicycle disc brake rotor 30 includes one of the first outer circumferential part 42 and the second outer circumferential part 52 and does not include the other one.

The inner circumferential portion 34 of the bicycle disc brake rotor 30 can be changed to any structure that includes at least one inner circumferential portion 34. In one example, the bicycle disc brake rotor 30 includes one of the first inner circumferential part 44 and the second inner circumferential part 54 and does not include the other one.

The structure of the bicycle disc brake rotor 30 for improving the heat dissipation can be changed to any structure that includes at least one cooling enhancement section. In one example, the bicycle disc brake rotor 30 includes one of the first cooling enhancement section 46 and the second cooling enhancement section 56 and does not include the other one.

The structure of the bicycle disc brake rotor 30 for applying a brake can be changed to any structure that includes at least one brake surface. In one example, the bicycle disc brake rotor 30 includes one of the first brake surface 42A and the second brake surface 52A and does not include the other one.

The bicycle disc brake rotor 30 can further include a structure for removing objects such as water and mud from at least one brake surface. A first example of the removal structure includes at least one hole that extends through the first outer circumferential part 42, the first inner circumferential part 44, the second inner circumferential part 54, and the second outer circumferential part 52. A second example of the removal structure includes at least one hole that extends through the first outer circumferential part 42 and/or at least one hole that extends through the second outer circumferential part 52. A third example of the removal structure includes the holes of the first example and the second example.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle disc brake rotor that has a rotation axis, the bicycle disc brake rotor comprising:
   at least one outer circumferential portion including at least one brake surface;
   a first inner circumferential part coupled to the at least one outer circumferential portion, the first inner circumferential part including a first cooling enhancement section, the first cooling enhancement section including a first opening; and
   a second inner circumferential part coupled to the at least one outer circumferential portion, the second inner circumferential part including a second cooling enhancement section, the second cooling enhancement section including a second opening that is different from the first opening,
   each of the first and second inner circumferential parts being at least partially located radially inward from the outer circumferential portion with respect to the rotation axis,
   the first and second inner circumferential parts being arranged to form a gap between the first and second inner circumferential parts an in an axial direction that extends parallel to the rotation axis, and
   the first opening and the second opening being disposed opposite each other in the axial direction and in communication with the gap.

2. The bicycle disc brake rotor according to claim 1, wherein
   the first and second inner circumferential parts are opposed in the axial direction, which extends parallel to the rotation axis.

3. The bicycle disc brake rotor according to claim 1, wherein
   each of the first and second inner circumferential parts partially overlaps with the outer circumferential portion as viewed in the axial direction, which extends parallel to the rotation axis.

4. The bicycle disc brake rotor according to claim 1, wherein
   the second cooling enhancement section further includes at least one heat dissipation fin.

5. The bicycle disc brake rotor according to claim 4, wherein
   the at least one heat dissipation fin includes at least one heat dissipation piece that faces in the axial direction.

6. The bicycle disc brake rotor according to claim 5, wherein
   the second opening and the at least one heat dissipation piece are obtained by partially bending the second inner circumferential part.

7. The bicycle disc brake rotor according to claim 1, further comprising
   a coupling member including a hub coupling portion coupled to a hub of a bicycle.

8. The bicycle disc brake rotor according to claim 7, wherein
   the coupling member is coupled to the at least one outer circumferential portion.

9. The bicycle disc brake rotor according to claim 7, wherein
   at least one heat dissipation fin is located between the hub coupling portion and the at least one outer circumferential portion in a radial direction with respect to the rotation axis.

10. The bicycle disc brake rotor according to claim 1, wherein
    the second opening has a wider area than the first opening.

11. The bicycle disc brake rotor according to claim 1, wherein
    the first opening is a slit.

12. The bicycle disc brake rotor according to claim 1, wherein
    the first and second inner circumferential parts are separated by a distance that increases toward the rotation axis in a radial direction with respect to the rotation axis.

13. The bicycle disc brake rotor according to claim 1, wherein
    the first and second inner circumferential parts have a higher thermal, conductivity than the at least one outer circumferential portion.

14. The bicycle disc brake rotor according to claim 1, wherein
    the at least one outer circumferential portion includes a first material, and
    the first and second inner circumferential parts include a second material that is different from the first material.

15. The bicycle disc brake rotor according to claim 14, wherein
    the first material is stainless steel, and
    the second material is aluminum or an aluminum alloy.

16. The bicycle disc brake rotor according to claim 1, further comprising
    a third inner circumferential part that is coupled to the at least one outer circumferential portion and that includes a section located radially inward from the at least one outer circumferential portion with respect to the rotation axis, and
    the third inner circumferential part is located between the first inner circumferential part and the second inner circumferential part in a direction in which the rotation axis extends.

17. A bicycle disc brake rotor that has a rotation axis, the bicycle disc brake rotor comprising:
    at least one outer circumferential portion including at least one brake surface;
    a first inner circumferential part coupled to the at least one outer circumferential portion;
    a second inner circumferential part coupled to at least one outer circumferential portion;

a coupling member including a hub coupling portion coupled to a hub of a bicycle; and at least one heat dissipation fin located between the hub coupling portion and the at least one outer circumferential portion in a radial direction with respect to the rotation axis, each of the first and second inner circumferential parts being at least partially located radially inward from the outer circumferential portion with respect to the rotation axis, the first and second inner circumferential parts being arranged to form a gap between the first and second inner circumferential parts an in an axial direction that extends parallel to the rotation axis, at least one of the first and second inner circumferential parts including at least one cooling enhancement section, the at least one cooling enhancement section including at least one opening that is in communication with the gap, the coupling member further includes at least two connection portions coupled to the at least one outer circumferential portion and extending radially outward from the hub coupling portion, and the at least one heat dissipation fin is located between the at least connection portions in a circumferential direction with respect to the rotation axis.

18. A bicycle disc brake rotor that has a rotation axis, the bicycle disc brake rotor comprising:

at least one outer circumferential portion including at least one brake surface;

a first inner circumferential part coupled to the at least one outer circumferential portion;

a second inner circumferential part coupled to the at least one outer circumferential portion; and a coupling member including a hub coupling portion coupled to a hub of a bicycle, each of the first and second inner circumferential parts being at least partially located radially inward from the outer circumferential portion with respect to the rotation axis, the first and second inner circumferential parts being arranged to form a gap between the first and second inner circumferential parts an in an axial direction that extends parallel to the rotation axis, at least one of the first and second inner circumferential parts including at least one cooling enhancement section, the at least one cooling enhancement section including at least one opening that is in communication with the gap, the coupling member further includes at least two connection portions coupled to the at least one outer circumferential portion and extending radially outward from the hub coupling portion, and each of the first and second inner circumferential parts overlaps with the at least two connection portions as viewed in the axial direction, which extends parallel to the rotation axis.

* * * * *